United States Patent
Guo et al.

(10) Patent No.: US 8,750,100 B2
(45) Date of Patent: Jun. 10, 2014

(54) AVOIDING BROKEN LINKS IN SMART METER NETWORKS FOR LOOP-FREE ROUTING OF PACKETS

(75) Inventors: Jianlin Guo, Newton, MA (US); Chuan Han, Blacksburg, VA (US); Ghulam M Bhatti, Mansfield, MA (US); Philip Orlik, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 63 days.

(21) Appl. No.: 13/371,423

(22) Filed: Feb. 11, 2012

(65) Prior Publication Data

US 2013/0208583 A1 Aug. 15, 2013

(51) Int. Cl.
*G01R 31/08* (2006.01)
(52) U.S. Cl.
USPC .......................................... 370/225; 370/400
(58) Field of Classification Search
None
See application file for complete search history.

(56) References Cited

U.S. PATENT DOCUMENTS

| | | | | |
|---|---|---|---|---|
| 2011/0185075 | A1* | 7/2011 | Du et al. | 709/230 |
| 2011/0228788 | A1* | 9/2011 | Thubert et al. | 370/400 |
| 2012/0155463 | A1* | 6/2012 | Vasseur et al. | 370/390 |
| 2012/0307652 | A1* | 12/2012 | Vasseur et al. | 370/252 |
| 2012/0327792 | A1* | 12/2012 | Guo et al. | 370/252 |

OTHER PUBLICATIONS

Winter T et al. "RPL: IPv6 Routing Protocol for Low power Lossy Networks; draft-ietf-roll.txt," Engineering Task Force, IETF: Standardworkingdraft, Internet Society (ISOC) 4, Rue Des Falaises Ch-1205. Geneva, Switzerland, No. 19, Mar. 14, 2011, XP015074831.

* cited by examiner

*Primary Examiner* — David Oveissi
(74) *Attorney, Agent, or Firm* — Dirk Brinkman; Gene Vinokur

(57) ABSTRACT

Broken links in a sensor network are avoided by representing the network as a DODAG. A rank associated with each node defines a position of each node relative to other nodes, and the rank is in a form of a proper fraction, and the rank of each node never increases to enable loop-free routing.

19 Claims, 13 Drawing Sheets

AVOIDING BROKEN LINKS IN SMART METER NETWORKS FOR LOOP-FREE ROUTING OF PACKETS

FIELD OF THE INVENTION

This invention relates generally to routing of packets in wireless sensor networks, and particularly to routing packets in smart meter networks with broken links.

BACKGROUND OF THE INVENTION

Smart meters monitor the use of utilities, e.g., electricity, heat, gas and water, by a consumer. Typically, the smart meter communicates with a utility provider via network or grid, which can include, perhaps, millions of smart meters. Smart meters can turn utilities on or off, record usage information, detect service outages, unauthorized use, control utility consumption, and manage payments.

Smart meters must reliably and securely communicate with utility providers. Wired or wireless mesh network can be used. A number of protocols are known, e.g., ANSI C12.18, ANSI C12.19, and ANSI C12.21 for optical communications, as well as IEEE 802.15.4, IEEE P1901.2, and 802.11. The European Union uses IEC 61107 and IEC 62056. In Japan, the Energy Conservation is involved in promoting smart metering, as well as public and private utilities.

Smart meters can be connected to utility providers via one or more concentrators. The concentrators receive metering information from the smart meters, and forward the information to the providers for controlling or monitoring the utilities. The concentrator can also transmit control packets to smart meters for management purposes.

Smart meters can be equipped with lower power and lossy transceivers, such as ZigBee radios, and are deployed in a relatively large geometric region, e.g., entire counties. Therefore, smart meters and concentrators form a large scale wireless network, in which the concentrators maintain the network.

In such a large scale wireless network, data packets have to be relayed from a source node (source) to a destination node (destination) by multiple hop communications unless the source and the destination node are one-hop neighbors. Therefore, optimal routing of the packets is of primary importance, because the network requires high reliability and low latency for both metering information and control packet transmission.

A number of routing methods in mobile ad-hoc networks and wireless sensor networks are known. However, most methods are designed for point-to-point communications in relatively small networks, and therefore are not suited for smart meter networks in which there are only a few dedicated data concentrators.

One routing method is the Routing Protocol for Low Power and Lossy Networks (RPL), which is under development by the Internet Engineering Task Force (IETF). RPL is designed for large scale low power and lossy networks, such as smart meter networks.

In RPL, nodes are organized into one or more Destination Oriented Directed Acyclic Graphs (DODAG). Within a DODAG, a single destination node is the root of DODAG, and the DODAG root node (concentrators) collects the information generated in the network, and routes the information outside of the network, when necessary. RPL constructs and maintains the DODAG structure using DODAG Information Object (DIO) packets, which specify necessary parameters as configured from, and controlled by a policy at the DODAG root.

A rank is one of parameters in the DIO packet for DODAG construction and maintenance. The rank of a node defines a position of the node relative to other nodes with respect to a DODAG root. Each node maintains its own rank. The DODAG root node has the lowest rank of all the node's in the DODAG. Nodes maintain their ranks based on a parent-child relationship in which a child must have a rank strictly greater than all ranks of its parents. The DODAG root node has no parent.

A node can receive multiple DIO packets from neighboring nodes within the same DODAG.

To join a DODAG, the node selects a subset of the DIO packet transmitters as its parents, and determines its rank using an objective (cost) function. Among all its parents, the node selects one parent as its preferred parent to be used as the next hop node along upward routes to the concentrators.

It is assumed that smart meters are not energy-constrained. Instead, electric meters have hardware and communication capacity constraints that are primarily determined by cost, and secondarily by power consumption. As a result, deployments can vary significantly in terms of memory size, computation power and communication capabilities. For this reason, the use of RPL storing or non-storing mode is deployment specific.

When smart meters are memory constrained and cannot adequately store the route tables necessary to support hop-by-hop routing, RPL non-storing mode is preferred. If the nodes are capable of storing such routing tables, then the use of the storing mode may lead to reduced overhead and route repair latency. However, in high-density environments, storing routes can be challenging.

Therefore, RPL support of downward routes is determined by a Mode of Operation (MOP) in the DIO packet. The MOP is configured by the DODAG root, and cannot be changed by other nodes.

The MOP has three options so that the RPL cannot allow downward route or support downward routes with storing mode in which downward routes using in-network routing tables or support downward routes with non-storing mode in which downward routes using source routing from DODAG roots.

The directed acyclic structure is the key in the RPL. The acyclic structure is guaranteed as long as the rank of any node is strictly greater than all ranks of its parent nodes. It is safe for a node to decrease its rank, as long as its new rank remains greater than all ranks of its parents. However, increasing the rank can cause routing loops within the DODAG.

In conventional networks, a broken link can cause a loop. After the broken link detected, a node can advertise a rank of infinity. If this infinity rank advertisement is lost, then other nodes do not receive the advertisement and a packet circulates through the loop ad infinitum.

Though RPL provides a mechanism for resolving loops; it is known that the mechanism can cause even greater problems than the routing loop itself.

Therefore, it is desirable to provide a rank computation method for loop-free routing in smart meter networks with broken links. It is also desirable to provide a local DODAG repair method that does not create any loop.

SUMMARY OF THE INVENTION

The embodiments of the invention provide a rank computation method for loop-free routing in a smart meter network of nodes. Each node has a rank which never increases, even if a broken link is detected. As a result, the invented rank computation method prevents loops from occurring.

With the invented rank computation method, a node selects parents so that no loop is created.

We describe the embodiments with a network with use one concentrator. However, the embodiments are applicable to networks with multiple concentrators.

The method defines the rank as proper fraction where the numerator is less than the denominator. The method never increases the rank of the node during updating, even if a broken link is detected.

This invention provides a method for repairing a local Destination Oriented Directed Acyclic Graphs (DODAG) without causing loops. The repairing essentially avoids broken links.

The repair method applies to both storing mode and non-storing mode of RPL. Based on the invented rank computation method, a node can discover multiple unbroken routing links towards the DODAG root.

DETAILED DESCRIPTION OF THE PREFERRED EMBODIMENT

Figure 1:
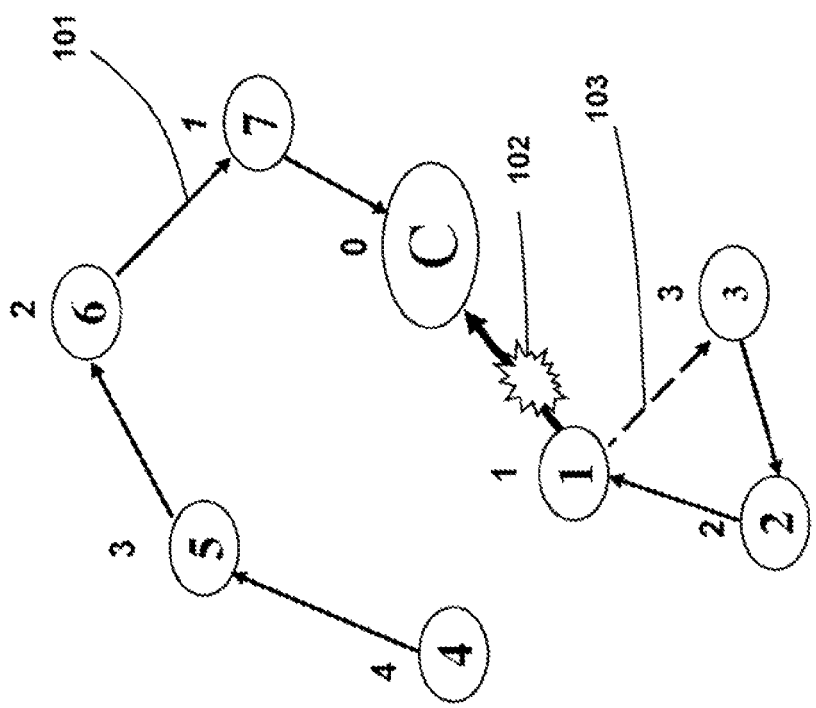
FIG. 1 is a schematic of a routing loop in a portion of a smart meter network which is avoided by embodiments of the invention.

FIG. 1 shows a portion of a smart meter network with a routing loop. The portion has nodes 1-7 with associated ranks r shown in italics above the nodes, and a concentrator C. Links between the nodes are represented by directed edges (arrows). Link 101 is to a preferred parent, link 102 between node 1 and the concentrator is broken, and link 103 is a link to a preferred parent that causes the loop because of the broken link.

Note, that here the ranks are integers. The method according to the invention can change the integers to be proper fractions that never increase in size when detecting broken links.

Because of the broken link, node 1 can "poison" the broken link by advertising a rank of infinity. If this infinity rank advertisement is lost, then node 2 and 3 do not receive the advertisement. As a result, node 2 still has node 1 as its preferred parent. Node 3 then advertises its rank with value of 3, node 1 receives advertisement from node 3, and selects node 3 as its parent, causing the loop through nodes 1-3-2-1-... ad infinitum.

It is an object of the invention to prevent loops in networks due to broken links as shown in FIG. 1.

Therefore with the invented rank computation method, node 1 in FIG. 1 does not select node 2 or node 3 as its parent. Instead, node 1 selects node 4 as its parent, so that no loop is caused.

Figure 2:
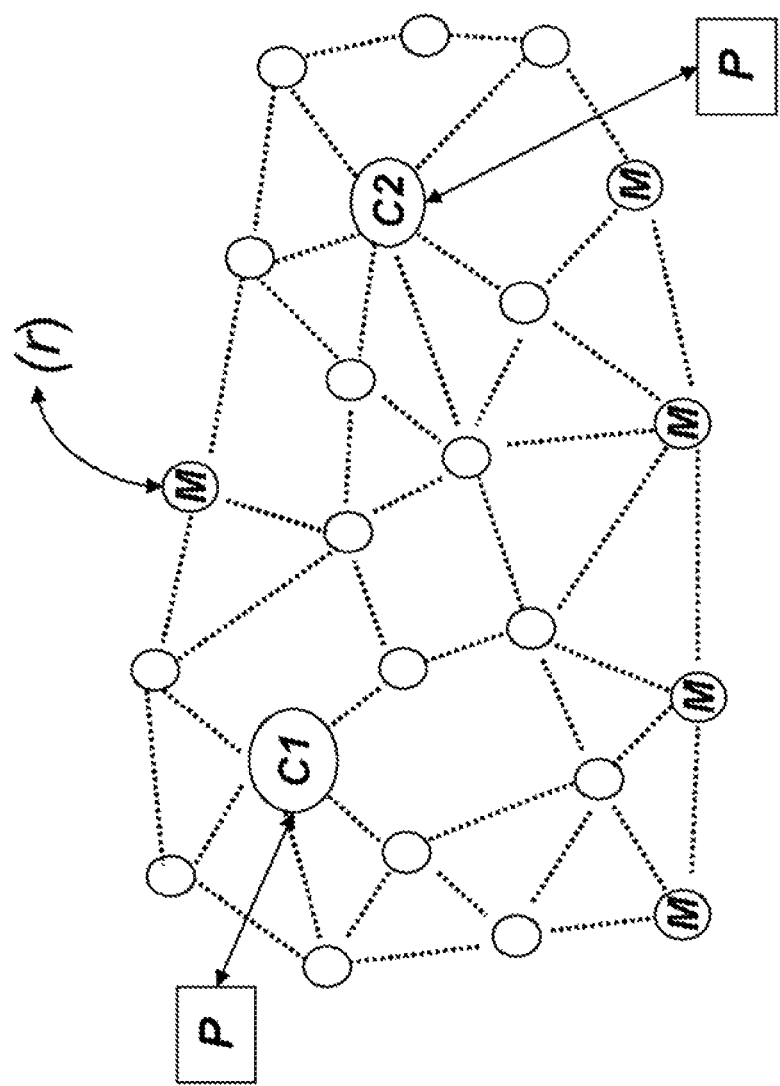
FIG. 2 is a schematic of a smart meter network in which embodiments of the invention operate.

FIG. 2 shows a smart meter network of nodes that uses embodiments of the invention for loop-free routing in a smart meter network, in which a node never increases its rank.

The network includes smart meter M, and concentrators C. The nodes are connected to each other by wired or wireless links. The wired links can be via power lines. The method is applicable to any known wireless communication standard.

The concentrators communicate with utility providers P. The nodes and link form a mesh network. Each node has an associated rank r.

In the smart meter network, each smart meter periodically collects information at a consumer and transmits the information to one or more concentrators. The concentrator is responsible for receiving the information and forwarding it to a provider for controlling or monitoring the smart meters. The information is communicated in data packets, described in greater detail below.

The concentrator can also transmit control packets to smart meters for management purposes. Smart meters are typically equipped with low power and lossy transceivers, such as the ZigBee radios, and are deployed in relatively large geometric regions. Therefore, smart meters and concentrators form a large scale mesh wireless network, in which the concentrators maintain the whole network.

In such a large scale wireless network, the packets have to be relayed from a source node (source) to destination node (destination) by multiple hop communications unless the source and destination are one-hop neighbors. The routing requires high reliability and low latency for both metering and control information.

In embodiments of the invention, the network is represented by a Destination Oriented Directed Acyclic Graphs (DODAG). In the DODAG, the smart meters are represented by nodes, and communication links between the meters are represented by directed edges. The nodes (smart meters) have associated ranks r.

The concentrator is root in the DODAG. Italic symbols, such as i, j, k, l, etc., are used to denote identifiers (ID) of smart meter nodes and C denotes identifier of concentrator. A node can be identified by, e.g., its IPv6 address, which is unique in the network.

Table 1 shows state parameters of a node i used by embodiments of the invention.

TABLE 1

| | |
|---|---|
| R(i) | Rank of node i, an unsigned integer pair (m, n) in a form of a proper fraction $\frac{m}{n}$ |
| P(i) | Parent set of node i |
| p*(i) | Preferred (*) parent of node i, the parent to which node i forwards an upward packet |
| c(i) | Minimal cost from node i to the concentrator such as hop count, delay, expected transmission times, etc. |
| c(i, j) | Cost from node i to node j |
| VN(i) | DODAG version number of node i |
| DR-SN(i) | DODAG repair sequence number of node i |
| $T_p$ | Parent threshold, below which a node can add more parents into P(i) |

Each smart meter node i can maintain multiple parents in the parent set P(i). For each parent p∈P(i), node i also records a rank R(p). At any time, node i maintains its parent set P(i) such that R(i)>R(p) for any node p∈P(i). For the concentrator node C, P(C) is always empty, i.e., |P(C)|=0.

Packet Types

Under the Routing Protocol for Low Power and Lossy Networks (RPL), multiple types of packets are defined.

According to embodiments of the invention, the format of a DODAG Information Object (DIO) packet is modified to accommodate our proper fraction rank definition.

Figure 3:
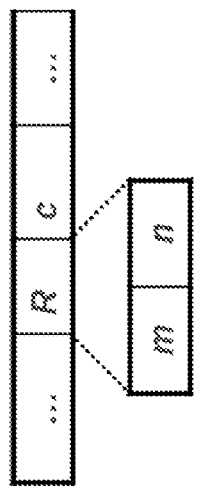
FIG. 3A is block diagram of a format of a modified DIO packet according to embodiments of the invention.
FIG. 3B is a block diagram of a format of a DODAG repair request packet according to embodiments of the invention.
FIG. 3C is a block diagram of a format of DODAG repair reply packet according to embodiments of the invention.

As shown in FIGS. 3A-3C, the DIO packet is modified, and two new packets are defined for local DODAG repair purpose. The new packets are defined as a DODAG repair request (DR-REQ) packet FIG. 3B, and a DODAG repair reply (DR-REP) packet FIG. 3C.

As define herein, the repair does not actually physically repair the broken link, which may be transient or permanent. Rather, the repair is performer on the DODAG so that broken links are avoided.

The modified DIO packet is shown in FIG. 3A. In the DIO packet, the rank R is modified from an unsigned integer, as in the prior art, to a proper fraction defined by a pair of unsigned integers (m, n), i.e., $\frac{m}{n}$.

In a proper fraction the numerator is less than the denominator. A cost c is added to the DIO packet. The cost is a minimal cost of the link(s) from a node to a DODAG root.

FIG. 3B shows the DR-REQ packet. The DR-REQ packet includes ID-Q, R-Q, VN-Q, SN-Q, NL-Q and other options ID-Q is an the identifier of the DR-REQ packet generator, R-Q is the rank of the DR-REQ packet generator, VN-Q is the DODAG version number of the DR-REQ packet generator, SN-Q is the DODAG repair sequence number of the DR-REQ packet generator, NL-Q is the node list travelled by DR-REQ packet, and NL-Q only exists in non-storing mode.

FIG. 3C shows the DR-REP packet. The DR-REP packet includes ID-Q, R-P, c, VN-P, SN-Q, D, R-Q, NL-P, and other options. ID-Q is the identifier of DR-REQ packet generator or destination node identifier of DR-REP packet, R-P is the rank of the DR-REP packet generator if DR-REP packet travels upwards and is the rank of the transmission node if DR-REP packet travels downwards, c is the minimal cost of the link(s) from the DR-REP packet transmission node to the DODAG root, VN-P is the DODAG version number of DR-REP packet generator, SN-Q is the DODAG repair sequence number of DR-REQ packet generator, D indicates the DR-REP packet travel direction, R-Q is rank of the DR-REQ packet generator, and NL-P is combination of NL-Q in the DR-REQ packet and node list travelled by the upward DR-REP packet. D, R-Q, and NL-P only exist in non-storing mode.

Rank Definition and Rank Split Operation

For a node i, the rank R(i) is defined as a proper fraction such that

R(i)=m/n, where 0≤m≤n, m and n are integers, and 0<n.

The rank of node i is denoted as R(i)=(m, n).

For any two ranks R(i)=(m, n) and R(j)=(p, q), a rank split operation is defined as sp(R(i), R(j))=sp((m, n), (p, q))=(m+p)(n+q).

The split operation sp(R(i), R(j)) splits rank (m, n) and (p, q), and generate a new rank (m+p)/(n+q).

If m/n<p/q, then m/n<(m+p)+(n+q)<p/g

That is, the split operation sp(R(i), R(j)) generates a new rank between ranks R(i) and R(j). If the rank is reducible, it is reduced by dividing both the numerator and the denominator with a largest common factor.

The advantage of the invented rank definition is based on the following realization. There are infinite number of proper fractions between any two proper fractions m/n and p/q. By utilizing this feature of the proper fraction, the invented rank computation method guarantees that the rank of a node never increases even when a broken link is detected. That is, if a current rank is (m, n) m/n, then the new rank is (p, q)=p/q, and p/q is less than m/n.

If the rank in the form of the proper fraction cannot increase, then the loop-free routes can be guaranteed.

Initially, for the concentrator node C, c(C)=0, VN(C)=δ>0, |P(C)|=0, and rank R(C) can be any proper fraction such that R(C)<(1, 1). R(C)=(0, 1)=0/1 is used for example. For smart meter node i, c(i)=∞, VN(i)=0, $T_p$=predefined value, DR-SN(i)=1, |P(i)|=0, and rank R(i) can be any proper fraction such that R(C)<R(i)≤(1, 1). R(i)=(1, 1)=1/1 is used for example.

DODAG Construction

The DODAG is constructed by using the DM packet. The DIO packet is transmitted using a trickle timer. Trickle timing enables nodes in a lossy shared medium, e.g., low power and lossy networks, to exchange information in an energy efficient and scalable manner. Inconsistencies are resolved in milliseconds. When nodes agree, the communication rate is decreased exponentially so that nodes send packets very infrequently, e.g., a few packets per hour. Instead of flooding a network with packets, a small trickle of packets, just enough to maintain consistency, are transmitted.

Initially, smart meter nodes do not transmit the DIO packet because some fields of the DIO packet can only be configured by the DODAG root. The DIO packet is sent by transmitting link-local multicast to all-RPL-nodes. The DODAG root, which is a concentrator, initiates a new DODAG construction process by transmitting the DIO packet with an increased DODAG version number.

In response to receiving the DIO packet, a node can update its state only if one of the following conditions holds:
(1) the DODAG version number in the DIO packet is greater than the DODAG version number of the receiving node; and
(2) the DODAG version number in the DIO packet equals the DODAG version number of the receiving node, and the rank in the DIO packet is lower than the rank of the receiving node.

The node updates its state parameters when its rank is the initial rank and one of the above conditions holds.

If a node updates its state parameters, the node can construct and transmit the DIO packet to "advertise" its new state parameters, such as the DODAG version number, rank, cost to the concentrator, etc.

The smart meter node does not transmit the DIO packet with its initial rank. The rank of the node is strictly greater than any rank of its parents.

A new DODAG is constructed when the concentrator transmits the DIO packet with a greater DODAG version number. Initially, the concentrator node C transmits the DIO packet with the DODAG version number greater than the version numbers of all smart meter nodes. Therefore, the concentrator node C transmits its initial DIO packet with the DODAG version number greater than 0, which is the initial DODAG version number of all smart meter nodes.

Upon receiving the DIO packet transmitted by the concentrator, neighbors of the concentrator, i.e., the first hop neighbors, update their state parameters, construct their DIO packets and transmit the DIO packets because the received DIO packet has a greater DODAG version number.

Upon receiving the DIO packets transmitted by the first hop neighbors, the second hop neighbors update their state parameters, construct their DIG packets and transmit the DIG packets because the received DM packet has a greater DODAG version number.

This DIO packet transmission process continues until all smart meter nodes in the network receive the DIG packets and update their state parameters. This is, the DODAG is completely constructed.

Figure 4:
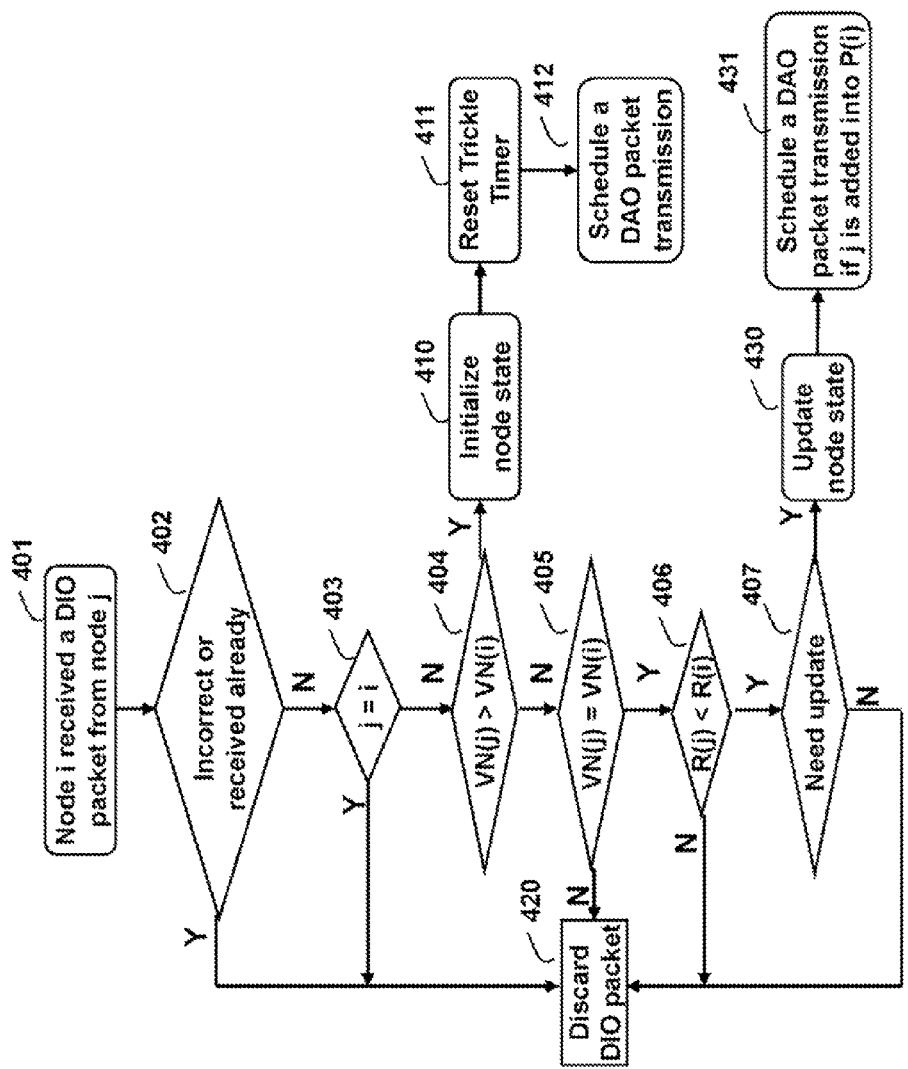
FIG. 4 is the flow chart of a DODAG construction process according to embodiments of the invention.

FIG. 4 shows the method for constructing the DODAG, where node j transmitted the DIG packet containing $R(j)$, $c(j)$ and $VN(j)$ and node i receives 401 the DIO packet. $R(i)$, $VN(i)$, $P(i)$, and $p^*(i)$ are state parameters maintained by node i.

In this and other figures, the steps of the methods can be performed in a processor connected to memory and input/output interfaces as known in the art. The processors can be located the concentrators, and smart meters, represented by any of the nodes in the graph.

Upon receiving the DIG packet, node i first checks 402 if the received DIG packet is incorrect or was received already. If yes, node i discards 420 the DIO packet. If no, node i checks 403 if the node identifier j equals its own identifier i. If yes, node i discards the DIO packet, because the node received the DIO packet transmitted by itself. Otherwise, go to step 404.

Node i checks 404 if the DODAG version number $VN(j)$ in the DIO packet is greater than its DAG version number $VN(i)$. If yes, node i initializes 410 its state parameters as $VN(i)=VN(j)$, $P(i)=\{j\}$, $p^*(i)=j$, $R(i)=sp((1, 1) R(j))$, $c(i)=c(j)+c(i,j)$, and clears downward routing tables if the mode of operation (MOP) is storing. Then, the node then resets 411 its trickle timer to transmit the DIO packet and also schedules 412 a Destination Advertisement Object (DAO) packet transmission when RPL supports downward routing. Otherwise, go to step 405.

Node i checks 405 if $VN(j)=VN(i)$. If no, it discards the DIO packet. If $VN(j)=VN(i)$ and if 406 $R(j) \geq R(i)$, node i discards the DIO packet. If $VN(j)=VN(i)$ and $R(j)<R(i)$, node i checks if 407 received the DIO packet causes any changes to its parent set, preferred parent or rank. If no, node i discards the DIO packet. If yes, node i updates state 430. If node j is not in its parent set and $|P(i)|<T_p$, node i adds node j into its parent set such that $$P(i) = P(i) \cup \{j\}, \; p^*(i) = \arg\min_{k \in P(i)} \{c(i, k) + c(k)\}.$$

If there are multiple parents that have the same minimal cost, node i can randomly pick one preferred parent), and $c(i)=c(p^*(i))+c(i, p^*(i))$. Node i then schedules 431 the DAO packet transmission to reflect new parent j. If node j is already in $P(i)$, node i makes necessary updates without scheduling the DAO packet transmission.

Figure 5:
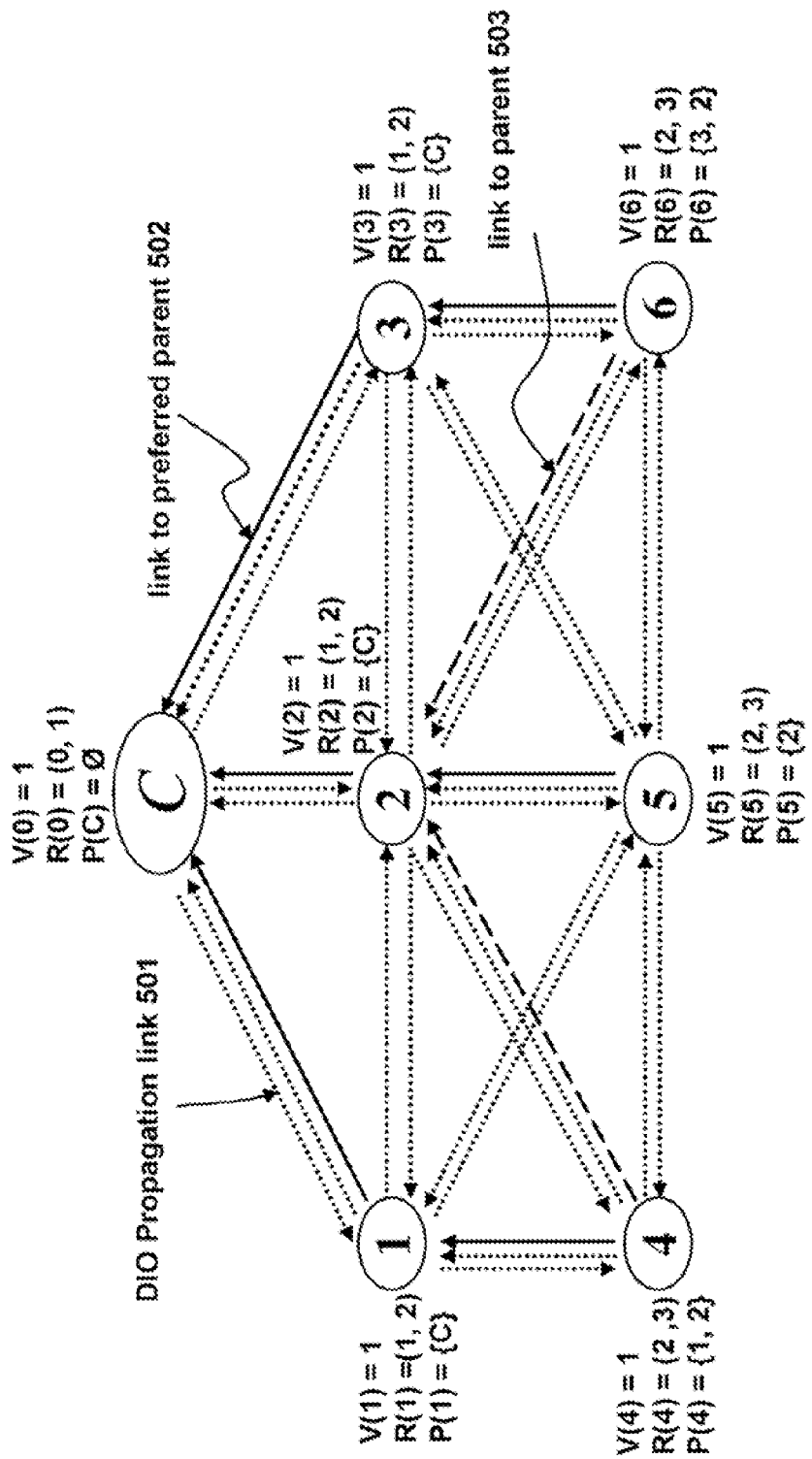
FIG. 5 is a schematic of the DODAG construction according to embodiments of the invention.

FIG. 5 schematically shows the construction of an example DODAG. In addition to the concentrator node C, and meter nodes 1-6, FIG. 5 also shows the DIO propagation link 501, the link 502 to the preferred parent, and the link 503 to the parent.

Initially, nodes 1-6 set their rank to (1, 1), the DODAG version number to 0, and the parent set is to empty. Concentrator node C sets its rank to (0, 1), the DAG version number to 1, and its parent set to empty. In this and other schematic, the ranks (m, n) are shown immediately above or below the nodes.

Concentrator node C transmits the DIO packet carrying its DODAG version number 1, and rank (0, 1). Nodes 1, 2 and 3 receive the DIO packet. Because the DODAG version number in the DIO packet is greater than the DODAG version numbers of nodes 1, 2, and 3, nodes 1, 2, and 3 update their DODAG version numbers to 1, ranks to sp((1, 1), (0, 1))=(1, 2), and select C as preferred parent.

With the new DODAG version number and rank, nodes 1, 2, and 3 transmit their DIO packets with DODAG version number 1 and rank (1, 2). The DIO packets from nodes 1, 2 and 3 are discarded by the concentrator C because the DODAG version number in the packet equals the DODAG version number of the concentrator, and the rank in the DIO packet is greater than the rank of the concentrator.

Node 1 discards the DIO packet from node 2, because the DODAG version number in the DIO packet equals the DODAG version number of node and the rank in the DIO packet equals node 1's rank. Similarly, node 2 discards the DIO packets from nodes 1 and 3, and node 3 discards the DIO packet from node 2. Node 4 first receives DIO packet from node 1.

Because the DODAG version number in the DIO packets is greater than that of node 4, node 4 updates its DODAG version number to 1, its rank to sp((1, 1), (1, 2))=(2, 3), and select node 1 as the preferred parent. Then, node 4 receives the DIO packets from node 2.

Because the DODAG version number in the DIO packets is equal to that of node 4, and the rank in the DIO packet is smaller than node's rank, node 4 adds node 2 into its parent set. Similarly, Node 6 receives the DIO packets from nodes 2 and 3, updates its DODAG version number to 1, rank to sp(1, 1), (1, 2))=(2, 3), adds nodes 2 and 3 into its parent set, and selects node 3 as the preferred parent. Node 5 receives the DIO packets from nodes 1, 2 and 3.

Because the DODAG version number in the these DIO packets is greater than that of node 5, node 5 updates its DODAG version number to 1, its rank to sp((1, 1), (1, 2))=(2, 3). However, node 5 only selects node 2 as its parent and preferred parent. Nodes 4, 5 and 6 also transmit their DIO packets.

These packets are discarded by their neighbors because the DODAG version number in the DIO packet equals the DODAG version number of the neighbors, and the rank of node 4, 5 and 6 are not lower than ranks of the neighbors.

Local DODAG Repair to Avoid Broken Links

When an upward link breaks, the broken link is avoided by the embodiments of the invention. The DODAG is maintained by switching to another parent and/or transmitting the DR-REQ packet. The DR-REQ packet is transmitted by the DR-REQ packet generator as a link-local multicast to all-RPL-nodes.

Upon receiving the DR-REQ packet, a link-local neighbor discards the DR-REQ packet if it does not have a link to the concentrator. If the link-local neighbor is the concentrator or has a link to the concentrator with the rank lower than the rank in the DR-REQ packet, then this neighbor generates the DR-REP packet.

If the link-local neighbor has a link to the concentrator and its rank is greater than or equal to the rank in the DR-REQ packet, then this neighbor forwards the DR-REQ packet to its preferred parent.

This forwarding process continues until the DR-REQ packet reaches a node which is either the concentrator or has a link to the concentrator with the rank lower than the rank in the DR-REQ packet. Then, the DR-REP packet is generated. Because the concentrator has the lowest rank among all the nodes, the DR-REQ packet is replied at least by the concentrator.

In storing mode, the DR-REP packet generator transmits the DR-REP packet to the DR-REQ packet generator by using reverse routing tables. In non-storing mode, the DR-REP packet is forwarded up to the concentrator, which then transmits the DR-REP packet to the DR-REQ packet generator by using source routing.

Local DODAG Repair to Avoid Broken Links in Storing Mode

Figure 6A:
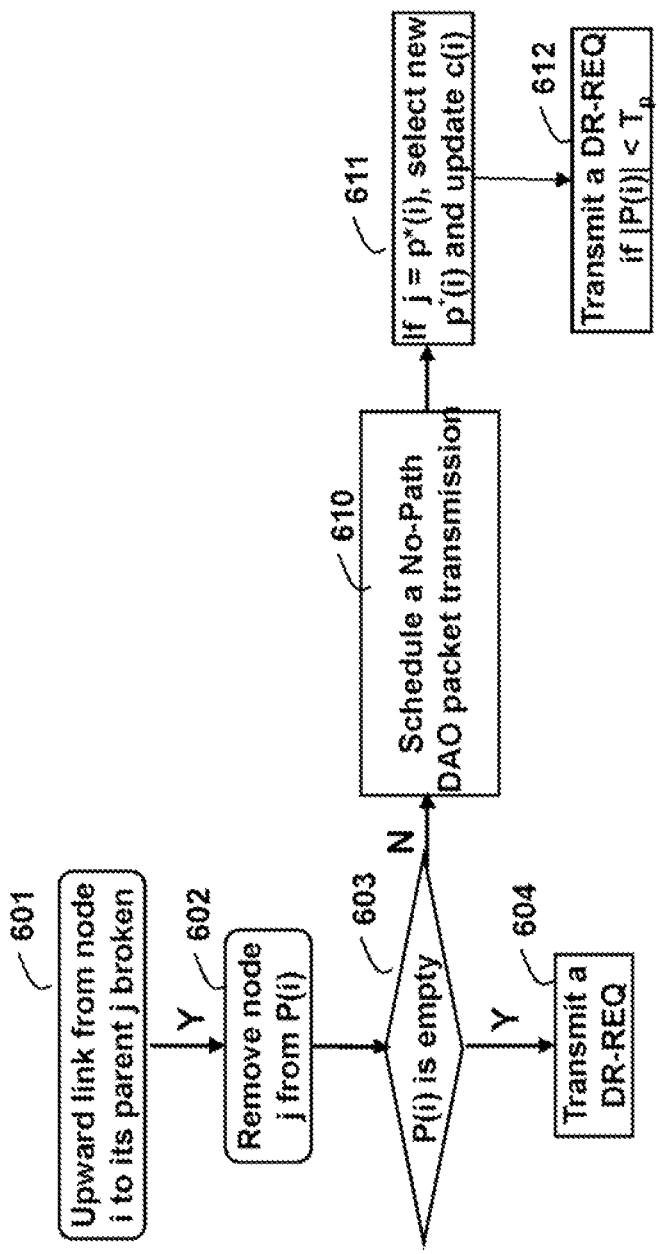
FIG. 6A is a flow chart of an upward link break handling process in storing mode according to embodiments of the invention.

FIG. 6A shows the upward link break avoidance process for the storing mode. If 601 the link between node i and its parent node j is broken, node i removes 602 node j from its parent set P(i), such that P(i)={k|R(k)<R(i), k∈P(i)/{j}}. If 603 the updated parent set P(i) is empty, then node i transmits the DR-REQ packet to discover new parents.

If the updated parent set P(i) is not empty, then node i schedules 610 a No-Path DAO packet transmission. Node i then checks 611 if node j was its preferred parent p*(i), and node i selects a new preferred parent p*(i) such that $$p^*(i) = \arg\min_{k \in P(i)} \{c(i, k) + c(k)\},$$

and updates c(i) as c(i)=c(i, p*(i))+c(p*(i)) if true.

Whether or not node j is node is preferred parent or not, node i can transmit the DR-REQ packet to discover additional parents if |P(i)|<$T_p$.

To transmit the DR-REQ packet in storing mode, node i increases its DR-SN(i) by 1 and sets ID-Q=i, R-Q=R(i), VN-Q=VN(i), and SN-Q=DR-SN(i).

DR-REQ Packet Processing

Figure 7A:
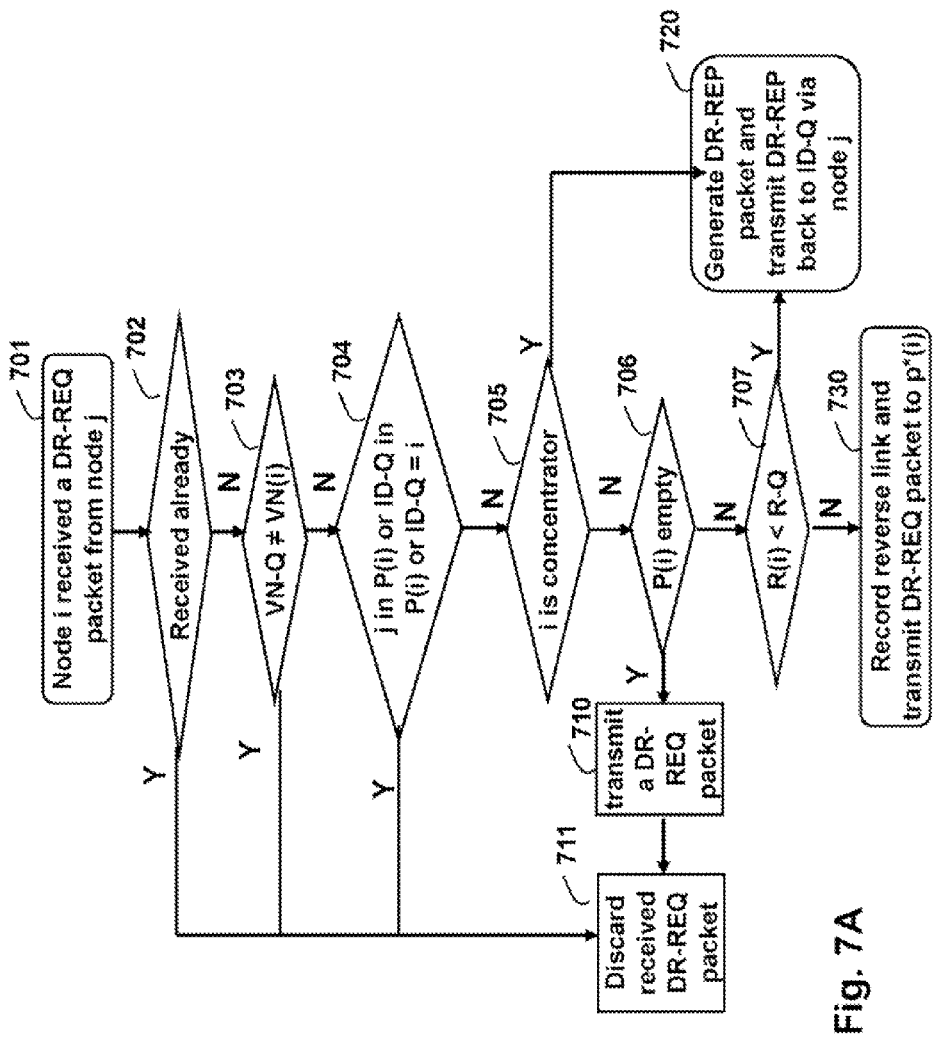
FIG. 7A is a flow chart of processing a DODAG repair request packet in storing mode according to embodiments of the invention.

FIG. 7A shows the processing for when a node i receives 701 the DR-REQ packet from node j. In FIG. 7A, ID-Q, R-Q, VN-Q and SN-Q are the parameters in the DR-REQ packet, and R(i), VN(i), and P(i) are state parameters of node i.

If 702 node i has already received the DR-REQ packet, as determined by comparing ID-Q and SN-Q, node i discards 711 the packet. Otherwise, go to step 703.

If 703 VN-Q in the DR-REQ packet is not equal to VN(i), node i discards the packet. Otherwise, go to step 704.

If 704 the DR-REQ packet is transmitted by one of node i's parents, i.e., j∈P(i), or if the DR-REQ packet is generated by its parent, i.e., ID-Q∈P(i), or if node i is the DR-REQ packet generator, i.e., ID-Q=i, node i discards the packet. Otherwise, go to step 705.

If 705 node i is the concentrator node, that is, i=C, node i accepts the DR-REQ packet, generates 720 a DR-REP packet by setting ID-Q=ID=Q in the DR-REQ packet, R-P=R(C), c=c(C), VN-P=VN(C), SN-Q=SN=Q in the DR-REQ packet, and transmits the DR-REP packet to node ID-Q via the next hop node j. Otherwise, go to step 706.

If 706 the parent set P(i) is empty, the node i transmits 710 its DR-REQ packet and discards 711 the received DR-REQ packet. Otherwise, go to step 707.

If 707 R(i)<R-Q, then node i accepts the DR-REQ packet, and generates 720 the DR-REP packet by setting ID-Q=ID-Q in the DR-REQ packet, R-P–R(i), c–c(i), VA-P–VN(i), SN-Q–SN-Q in the DR-REQ packet, and transmits the DR-REP packet to node ID-Q via the next hop node j. Otherwise, go to step 730.

If R(i)≥R-Q, node i records 730 a reverse routing entry (ID-Q, SN-Q, R-Q, j) to node ID-Q into its DODAG repair reverse routing table, and transmits the DR-REQ packet to its preferred parent p(i).

The above packet forwarding process continues until the DR-REQ packet is discarded 711 when the receiving node does not have a parent, or the DR-REQ packet reaches a node k that is either the concentrator, or has rank R(k)<R-Q with |P(k)|≠0. Then, node k generates 720 the DR-REP packet by setting ID-Q ID-Q, R-P R(k), c c(k), i"N-P VN(k), SN-Q=SN-Q in the DR-REQ packet, and transmits the DR-REP packet to node ID-Q via the next hop node from which node k received the DR-REQ packet.

The DODAG repair packet reverse routing table is initially set to empty. This table is cleared when a node joins the DODAG.

DR-REP Packet Processing

Figure 8A:
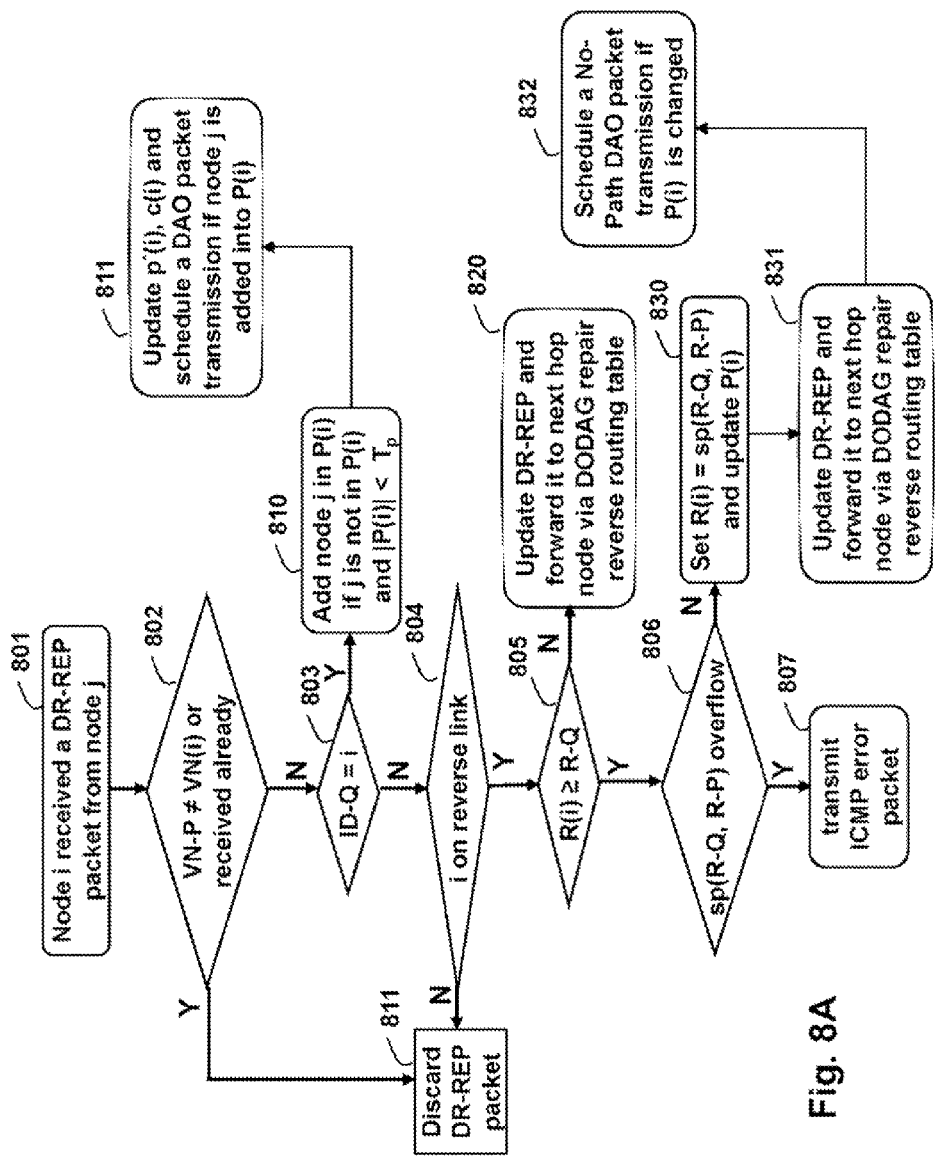
FIG. 8A is a flow chart of processing the DODAG repair reply packet in storing mode according to embodiments of the invention.

FIG. 8A shows the processing when node i receives 801 the DR-REP packet from node j. In FIG. 8A, ID-Q, R-P, VN-P, and SN-Q are parameters in the DR-REP packet, R(i), VN(i), P(i), p*(i), c(i), and $T_p$ are state parameters of node i, R-Q is the rank of the DR-REQ packet generator and is from the DODAG repair reverse routing table.

If 802 VN-P≠VN(i) or the DR-REP packet was received already, node i discards 811 the packet. Otherwise, go to step 803.

If 803 ID-Q=i, i.e., node i is the DR-REQ packet generator, and node j is not in P(i), node i adds 810 node j to P(i) if |P(i)|<$T_p$ such that P(i)={k|R(k)<R(i), k∈P(i)∪{j}} and updates 811 p*(i) and c(i) as $$p^*(i) = \arg\min_{k \in P(i)} \{c(i, k) + c(k)\}, \quad c(i) = c(p^*(i)) + c(i, p^*(i)).$$

Then, node i schedules the DAO packet transmission when node j is added into its parent set. If D-ID≠i, go to step 804.

If 804 node i is not on a reverse link, i.e., there is not an entry (ID-Q, SN-Q, R-Q, l) in its DODAG repair packet reverse routing table, then node i discards 811 the packet. Otherwise, go to step 805.

If 805 R(i)<R-Q, node i updates 820 the DR-REP packet by setting R-P=R(i) and c–c(i), forwards the DR-REP packet to next hop node l. In storing mode, this case occurs if node i is on reverse links generated by multiple nodes. When node i receives the first DR-REP packet, it reduces its rank. Therefore, subsequent DR-REP packets can carry ranks R-Q greater than R(i). If node i is only on a single reverse link, then R(i)=R-Q must be true based on the DR-REQ packet process procedure.

If 805 R(i)≥R-Q, then node i checks 806 if sp(R-Q, R-P) overflows. If not, node i decreases its rank R(i) and updates 830 its parent set P(i) as R(i)=sp(R-Q, R-P), P(i)={k|R(k)<R(i), k∈P(i)}. Then, node i updates 831 the DR-REP packet by setting R-P–R(i) and c–c(i), forwards DR-REP packet to next hop node 1, and schedules a No-Path DAO packet transmission if its parent P(i) is changed via deletion of parent due to its rank decrease.

If sp(R-Q, R-P) overflows; node i first simplifies sp(R-Q, R-P) if it is reducible. if there is no common factor greater than 1, node i transmits 807 an Internet Control Message Protocol (ICMP) error packet.

By definition of the rank split operation according to embodiments of the invention, it is easy to show that the rank R-P in the DR-REP packet is actually the maximal rank of nodes on the link from the DR-REP packet generator to the DR-REP transmission node. R-P is always less than R-Q. Therefore, when the DR-REP packet reaches the DR-REQ packet generator, the rank R-P in the DR-REP packet must be less than R-Q, which is the rank of the DR-REQ packet generator. That is, the rank monotonically increases along the link from the DE-REP packet generator to the DR-REQ packet generator. This, in turn, guarantees that rank increases monotonically along a routing link from concentrator to any smart meter node.

Local DODAG Repair to Avoid Broken Link in Non-Storing Mode

Figure 6B:
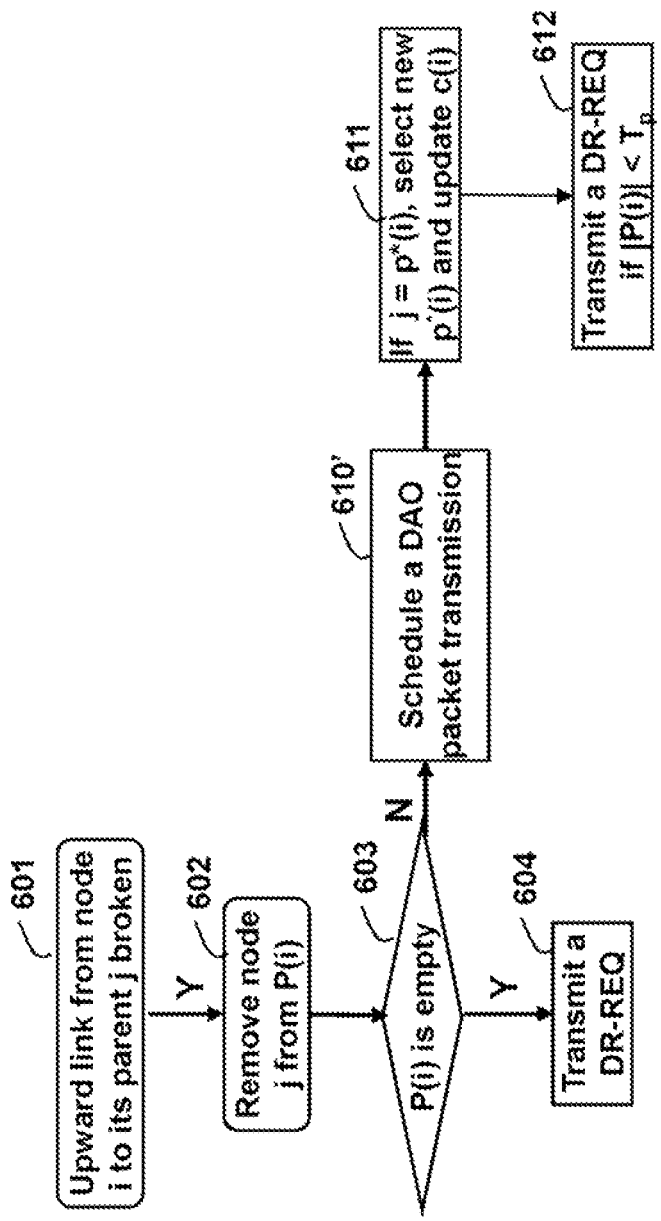
FIG. 6B is a flow chart of an upward link break handling process in non-storing mode according to embodiments of the invention.

As shown in FIG. 6B, the upward link break handling process in non-storing mode is similar as that in the storing mode.

One difference is that after removing node j from its parent set P(i), if P(i)' is not empty, node i schedules 610' a DAO packet transmission instead of No-Path DAO packet transmission.

The other difference is that to transmit the DR-REQ packet in non-storing mode, node i increases its DR-SN(i) by 1 and sets ID-Q=i, R-Q=R(i), VN-Q=VN(i), SN-Q=DR-SN(i) and NL-Q={i}.

Process DR-REQ Packet

Figure 7B:
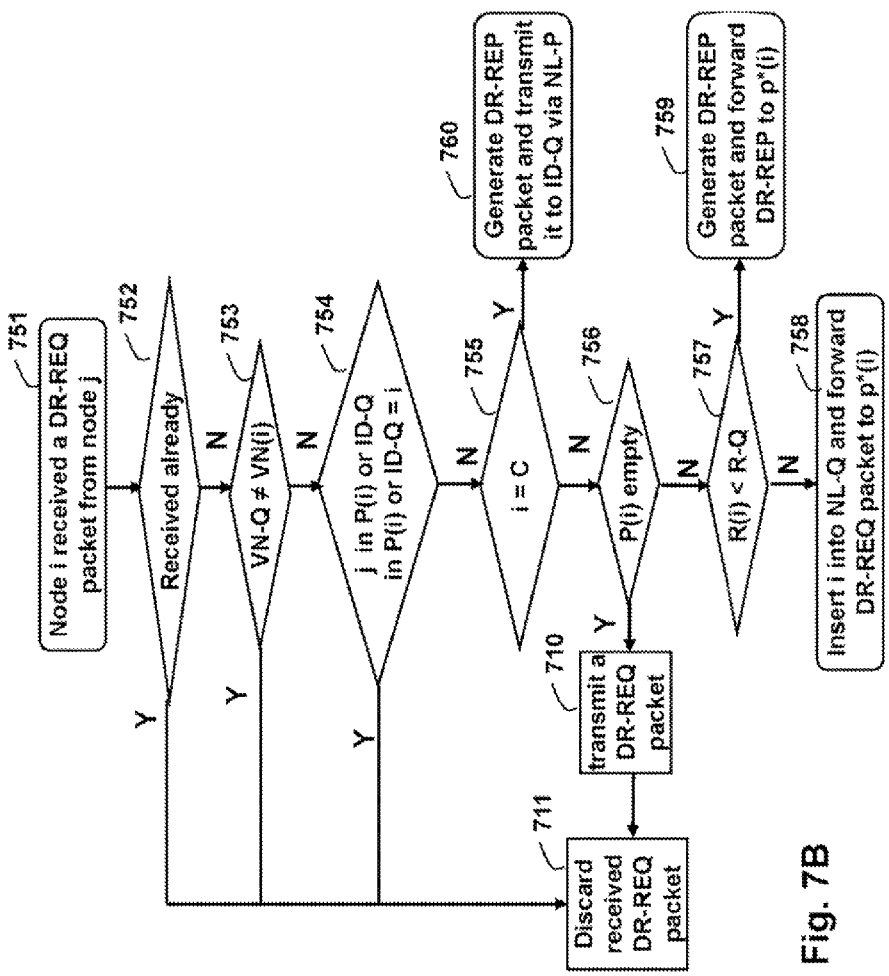
FIG. 7B is flow chart of processing the DODAG repair request packet in non-storing mode according to embodiments of the invention.

FIG. 7B shows the processing when the node i receives 751 the DR-REQ packet from node j. In FIG. 7B, ID-Q, R-Q, VN-Q, SN-Q, and NL-D are parameters in the DR-REQ packet and R(i), VN(i), and P (i) are state parameters of receiving node i.

If 752 node i received this DR-REQ packet already as determined by comparing ID-Q and SN-Q, then it discards 711 the packet. Otherwise, go to step 753.

If 753 VN-Q in the DR-REQ packet is not equal to VN(i), then node i discards the packet. Otherwise, go to step 754.

If 754 the DR-REQ packet is transmitted by one of node i's parents, i.e., j∈P(i), or if the DR-REQ packet is generated by its parent, i.e., ID-Q∈P(i), or if node i is the DR-REQ packet generator, i.e., ID-Q=i, then node i discards the packet. Otherwise, go to step 755.

If 755 node i is the concentrator node, i.e., I=C, node i accepts the DR-REQ packet, generates 760 the DR-REP packet by setting ID-Q=ID-Q in the DR-REQ packet, R-P=R (C), c=c(C), VN-P=VN(C), SN-Q SN-Q in the DR-REQ packet, D DOWN, R-Q=R-Q in the DR-REQ packet, NL-P=NL-Q∪{C}, and transmits the DR-REP packet to node ID-Q using source routing via NL-P. Otherwise, go to step 756.

If 756 node i is not the concentrator and its parent set P(i) is empty, then node i transmits 710 the DR-REQ packet and discards the received DR-REQ packet. Otherwise, go to step 757.

If 757 R(i)<R-Q, node i accepts the DR-REQ packet, and generates 759 the DR-REP packet by setting ID-Q=ID-Q in the DR-REQ packet, R-P=R(i), c=c(i), VN-P=VN(i), SN-Q=SN-Q in the DR-REQ packet, D=UP, R-Q=R-Q in the DR-REQ packet, NL-P=NL-Q∪{i}, and forwards the DR-REP packet to its preferred parent p*(i). Otherwise, go to step 758.

If R(i)≥R-Q, then node i updates DR-REQ packet by inserting 758 i in NL-Q such that NL-Q=N∪{i}, and forwards the DR-REQ packet to its preferred parent p*(i).

The above forwarding process continues until the DR-REQ packet is discarded when the receiving node does not have a parent or the DR-REQ packet reaches a node k that is either the concentrator or has a rank R(k)<R-Q with |(k)|≠0. Node k then generates the DR-REP packet by setting ID-Q=ID-Q in the DR-REQ packet, R-P=R(k), c c(k). VN-P=VN(k), SN-Q=SN-Q in the DR-REQ packet, D=UP if k≠C or D=DOWN if k=C, R-Q=R-Q in the DR-REQ packet, NL-P=NL-Q∪{k}, and forwards the DR-REP packet to its preferred parent p*(k) if k≠C, or transmits the DR-REP packet down to the node ID-Q by using source routing via NL-P if k=C.

DR-REP Packet Processing

Figure 8B:
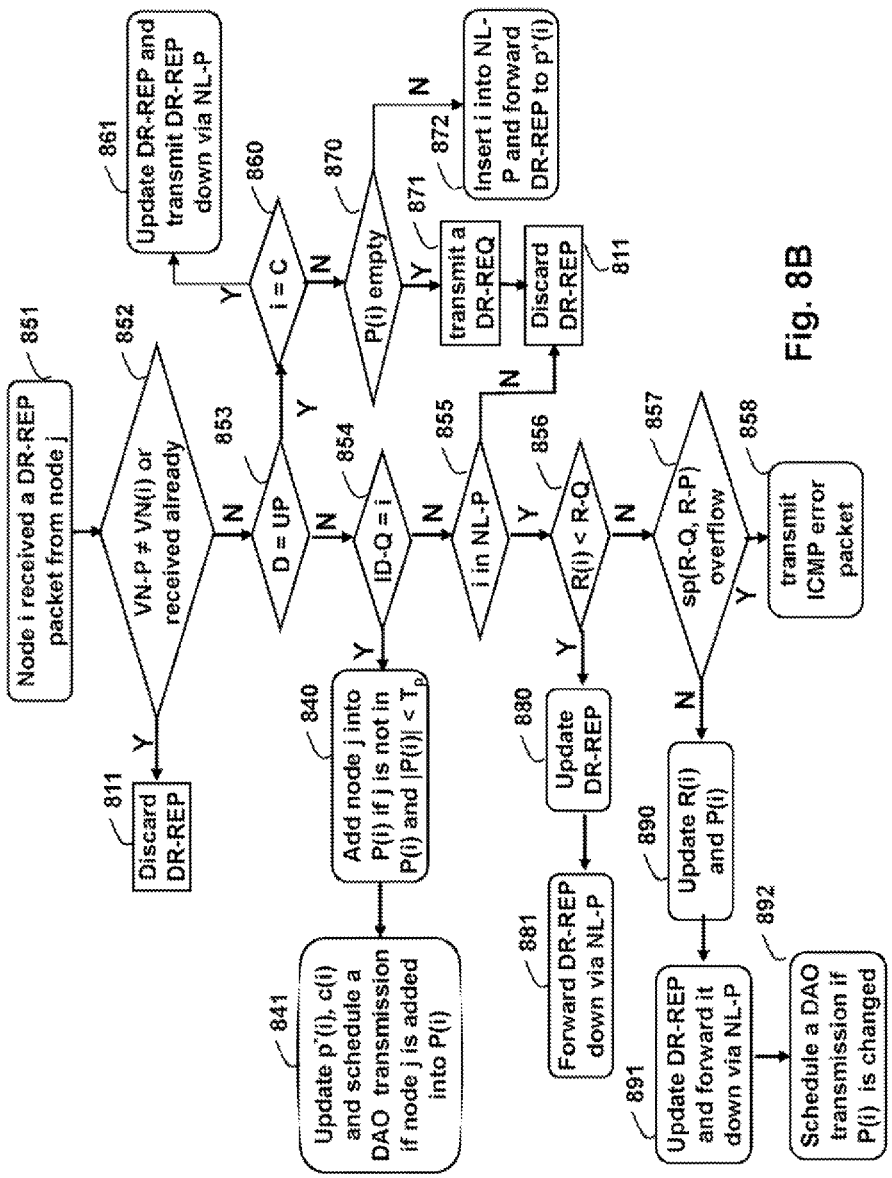
FIG. 8B is a flow chart of processing the DODAG repair reply packet in non-storing mode according to embodiments of the invention.

Node i receives 851 the DR-REP packet from node j. In FIG. 8B, ID-Q, R-P, VN-P, SN-Q, D, R-Q and NL-P are parameters in the DR-REP packet, R(i), VN(i), P(i), p*(i), c(i), and $T_p$ are state parameters of node i.

If 852 VN-P≠VN(i) or the DR-REP packet was received already, node i discards 811 the packet. Otherwise, go to step 853.

If 853 D=UP, i.e., the DR-REP packet is transmitted upwards, node i checks 860 if i=C, i.e., node i is concentrator. If yes, node i updates 861 the DR-REP packet by changing D DOWN, R-P=R(C), c=c(C), NL-P=NL-P∪{C}, and transmits DR-REP packet down to node ID-Q by source routing via NL-P.

If i≠C, i.e., and if node i is not concentrator, and 870 P(i) is not empty, node i updates DR-REP packet by inserting 872 i into NL-P such that NL-P=NL-P∪{i}, and forwards the DR-REP packet to the parent node p*(i).

If i≠C and P(i) is empty, then node i discards 811 DR-REP packet and transmits 871 the DR-REQ packet.

If D≠UP, i.e., D=DOWN and the DR-REP packet is transmitted downwards, then go to step 854.

If 854 ID-Q=i, i.e., node i is DR-REQ packet generator, if node j is not in P(i) and |P(i)|<$T_p$, node i adds 840 node j into P(i) such that P(i)={k|R(k)<R(i), k∈P(i) ∪{j}} and updates p*(i) and c(i) as $$p^*(i) = \arg\min_{k \in P(i)} \{c(i, k) + c(k)\}, \; c(i) = c(p^*(i)) + c(i, p^*(i)).$$

Node i then schedules k∈P(i) 841 the DAO packet transmission if node j is added into its parent set. If ID-Q≠i, go to step 855.

If 855 the node i is not on a source routing link, that is, node i is not in NL-P, node i discards 811 the packet. Otherwise, go to step 856.

If 856 R(i)<R-Q, node i updates 880 the DR-REP packet by setting R-P=R(i), c=c(i), and forwards 881 the DR-REP packet via NL-P. Otherwise, go to step 857.

Node i checks 857 if sp(R-Q, R-P) overflows. If not, node i decreases its rank R(i) and updates 890 its parent set P(i) as R(i)=sp(R-Q, R-P), P(i)={k|R(k)<R(i), k∈P(i)}. Node i then updates 891 the DR-REP packet by setting R-P=R(i), c=c(i), and forwards the DR-REP packet via NL-P. Furthermore, node i schedules 892 the DAO packet transmission if its parent P(i) is changed because of deletion of the parent due to its rank decrease.

If sp(R-Q, R-P) overflows, node i simplifies sp(R-Q, R-P), if it is reducible. If there is no common factor greater than 1, node i transmits 858 the ICMP error packet.

By definition of the rank split operation, it is easy to show that rank R-P in the downward DR-REP packet is the maximal rank of nodes on the source routing link from the concentrator node to DR-REP transmission node. R-P is always less than R-Q.

Therefore, when the DR-REP packet reaches the DR-REQ packet generator, the rank R-P in the DR-REP packet must be less than R-Q, which is the rank of the DR-REQ packet generator. That is, the rank monotonically increases from the concentrator to the DR-REQ packet generator. This, in turn, guarantees that rank increases monotonically along a routing link from concentrator to any smart meter node.

Local DODAG Repair Examples to Avoid Broken Links

Figure 9:
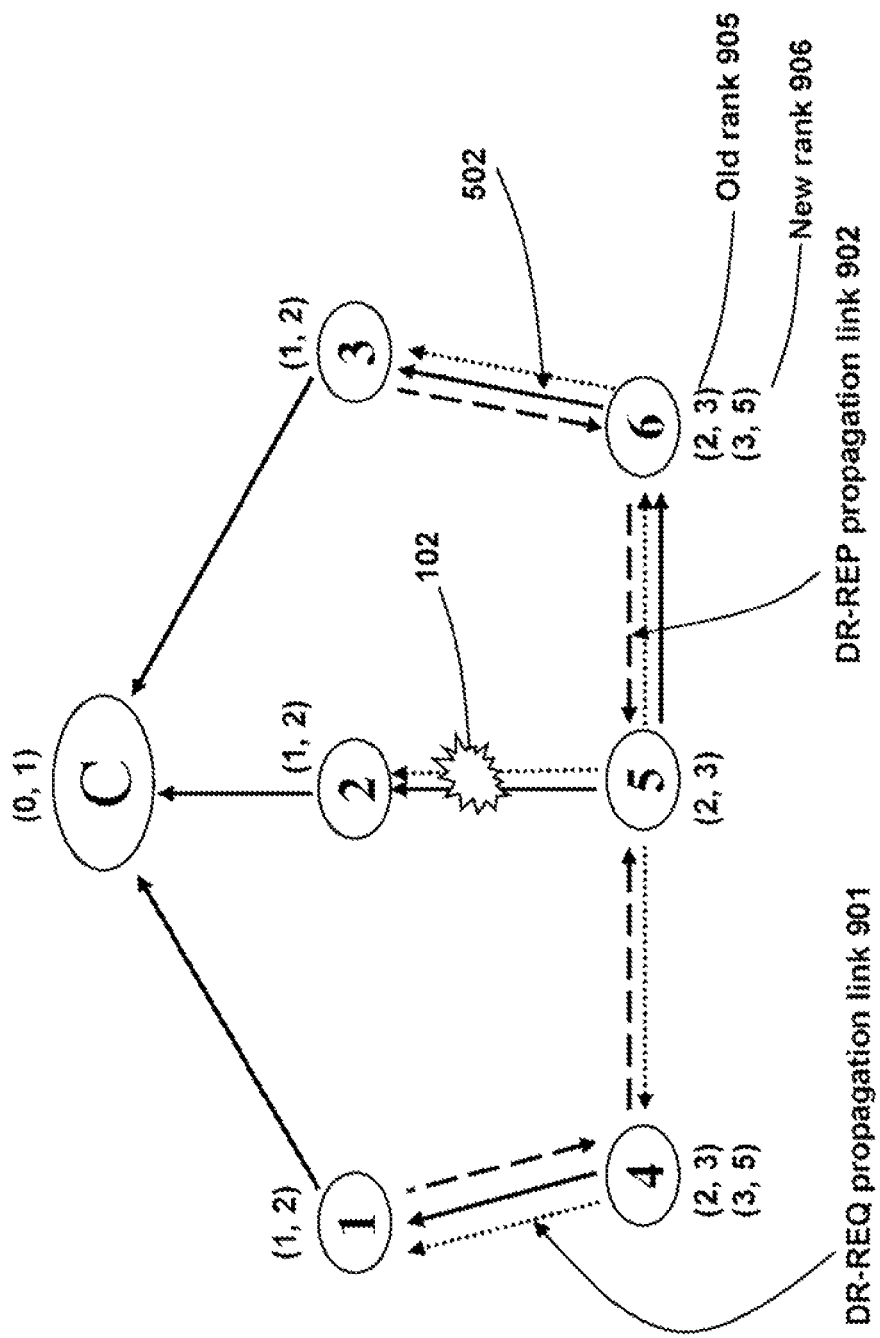
FIG. 9 is a schematic of local DODAG repair according to embodiments of the invention.

FIG. 9 schematically shows the repair processing for avoiding broken links 102. In addition to the concentrator node C, and meter nodes 1-6, FIG. 9 also shows the link 502 to the preferred parent, the DR-REQ propagation link 901, the DR-REP propagation the link 902, and old and new ranks 905-906.

If the link between node 5 and node 2 breaks 102, then node 5, transmits the DR-REQ packet. Nodes 4 and 6 receive this packet. Both of nodes have links to the concentrator, but the ranks of both nodes are not lower than the rank in the DR-REQ packet. Therefore, the DR-REQ packet is forwarded to their preferred parent nodes 1 and 3, respectively.

Also, node 4 and node 6 record reverse links to node 5 such that the nodes can forward future DR-REP packet to node 5. Nodes 1 and 3 have links to the concentrator and their ranks are lower than the rank in the DR-REQ packet. Therefore, they transmit DR-REP packets. This DR-REP packet transmission process updates the ranks of nodes along the links to the DR-REQ packet generator node 5. For nodes 4 and 6, the old rank 905 is (2, 3) and new rank 906 is (3, 5). Node 5 receives DR-REP packets from nodes 4 and 6, and selects node 6 as its preferred parent.

Figure 10:
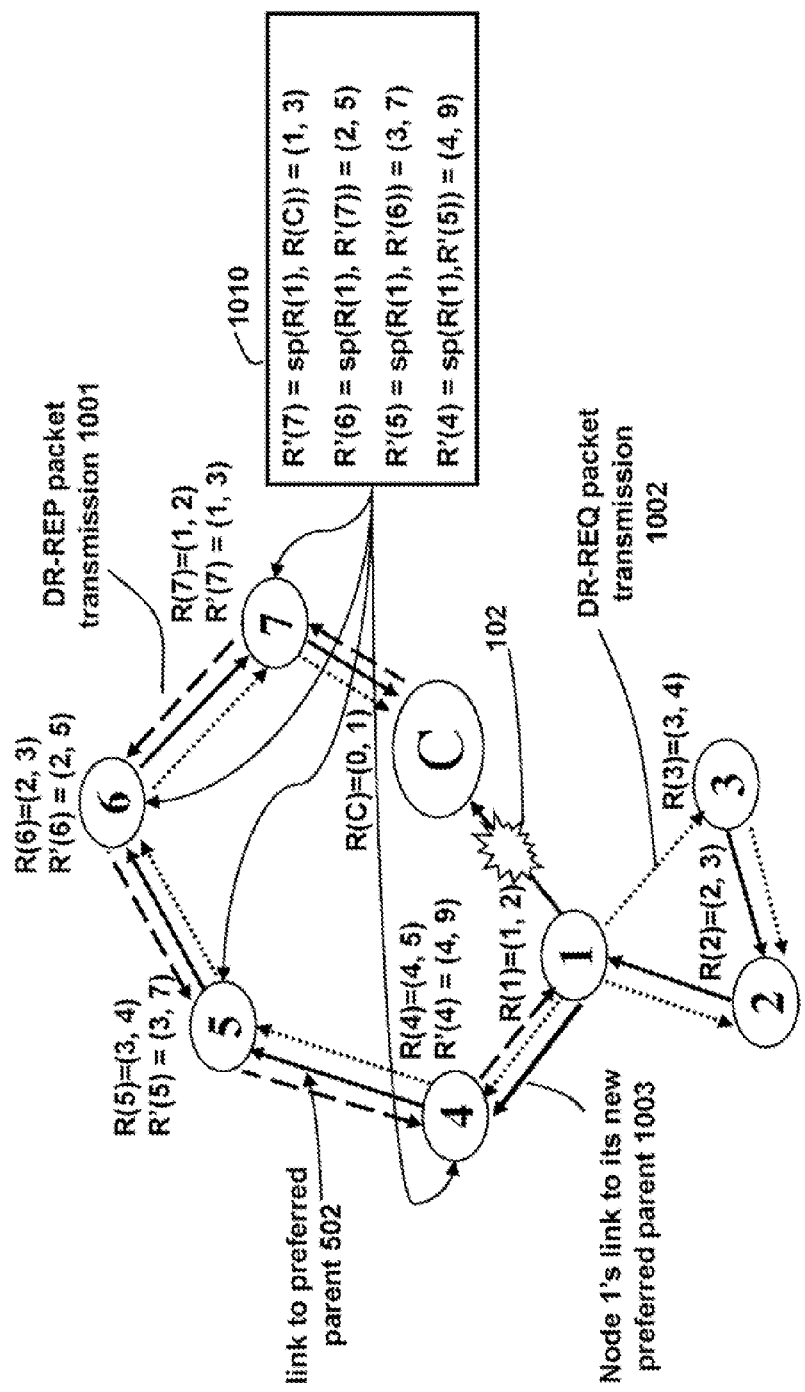
FIG. 10 is a schematic of avoiding a broken link according to embodiments of the invention.

FIG. 10 schematically shows how the broken link 102 in FIG. 1 is avoided by the invented local DODAG repair method, because ranks, in the form of proper fractions, never increase. Inset 1010, shows various split (sp) operations used during the repair processing. The figure also shows DR-REP packet transmission 1001, DR-REQ packet transmission 1002, and Node 1's link to its new preferred parent 1003.

R(i), for i=1, 2, . . . , 7, is the rank of node i. R(C) is the rank of concentrator node C. Node 1 removes node C from its parent set P(i) and transmits the DR-REQ packet with R-Q=R (1)=(1, 2). Node 2 discards the DR-REQ packet because DR-REQ packet is transmitted by its parent. Node 3 forwards the DR-REQ packet to node 2 because R-Q in the DR-REQ packet is smaller than its rank R(3).

However, the DR-REQ packet forwarded by node 3 is discarded by node 2 because the DR-REQ packet is generated by node 2's parent. Node 4 forwards the DR-REQ packet to node 5 because R-Q is smaller than R(4). Similarly, node 5 forwards the DR-REQ packet to node 6, node 6 forwards the DR-REQ packet node 7, and node 7 forwards the DR-REQ packet to the concentrator, which generates the DR-REP packet with R-P=R(C)=(0, 1).

Upon receiving DR-REP packet, node 7 decreases its rank to R'(7)=(1, 3) because R(7)≥R-Q, sets R-P=R'(7), and forwards the DR-REP packet to node 6. Similarly, node 6 decreases its rank to R'(6)=(2, 5), sets R-P=R'(6) and forwards DR-REP packet to node 5; node 5 decreases its rank to R'(5)=(3, 7), sets R-P=R'(5) and forwards DR-REP packet to node 4; node 4 decreases its rank to R'(4)=(4, 9), sets R-P=R' (4) and forwards the DR-REP packet to node 1. Upon receiving the DR-REP packet from node 4, node 1 selects node 4 as its preferred parent.

The local DODAG repair process initiated by node 1 is completed. After the local DODAG repair, the parent-child relationship is 3→2→1→4→5→6→7→C.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for avoiding a broken link in a network of smart meters and concentrators when routing packets between the smart: meters and the concentrators, wherein the smart meters and concentrators are connected by commnication links, comprising the steps of:
   representing the network by a Destination Oriented Directed Acyclic Graph (DODAG), wherein nodes in the graph represent the smart meters and concentrators, and the concentrators are root nodes roots in the DODAG, and directed edges represent the links; and
   associating each node with a rank, wherein the rank defines a position of each node relative to other nodes and with respect to the root of the DODAG, and wherein the root has a lowest rank of all the nodes in the DODAG, and the nodes maintain the ranks based on a parent-child relationship in which each child must have a rank strictly greater than all the ranks of parents of children, and the root has no parent, and wherein the rank is in a form of a proper fraction, and wherein the rank of each node never increases even if the broken link is detected to enable loop-free routing,
   defining the rank R(i)=(m, n) for a node i as R(i)=m/n, where 0≤m≤n, m and n are integers, and 0<n; and
   defining for any two ranks R(i)=(m, n) and R(j)=(p, q) as split operation as sp(R(i), R(j))=sp ((m, n), (p, q))=(m+p)/(n+q) so that the split operation sp(R(i), R(j)) splits rank (m, n) and (p, q), and generate a new rank (m+p)/(n+q), and if m/n<p/q, then m/n<(m+p)/(n+q)<p/q, wherein the steps are performed in processors in the smart meters and concentrators.

2. The method of claim 1, wherein the routing uses a Routing Protocol for Low Power and Lossy Networks (RPL).

3. The method of 1, wherein the smart meters discover one or more unbroken links to at least one concentrator.

4. The method of claim 1. wherein the routing uses a Routing Protocol for Low Power and Lossy Networks (RPL), and the smart meters discover one or more unbroken links to at least one concentrator, and the discovering applies to a storing mode and non-storing mode of the RPL.

5. The method of claim 1 , wherein the packets include an Information Object (DIO) packet, a DODAG repair request (DR-REQ) packet, and a DODAG repair reply (DR-REP) packet, and wherein the DIO packet stores the rank of the packet transmitter, and a minimal cost associated with one or more links to at least one concentrator.

6. The method of claim 5, wherein upon receiving the DR-REQ packet, the root generates a DR-REP packet and transmits the DR-REP packet to the node that initiated a local DODAG repair using a reverse routing table in storing mode or using source routing in non-storing mode.

7. The method of claim 5, wherein upon receiving the DR-REQ packet in a particular node, the particular node forwards the DR-REQ packet to a preferred parent if the rank of the particular node is greater than the rank in the DR-REQ packet.

8. The method of claim 5, wherein receiving the DR-REQ packet, a particular node generates the DR-REP packet if the rank of the particular node is lower than the rank in the DR-REQ packet and the particular node has a valid routing link to the root, and the particular node transmits the DR-REP packet downwards to the node that initiated a local DODAG repair by using a reverse routing table in storing mode or the particular node transmits the DR-REP packet upwards to a preferred parent in non-storing mode.

9. The method of claim 5, wherein upon receiving the DR-REP packet transmitted upwards in non-storing mode, a particular node forwards the DR-REP packet to a preferred patent, and wherein upon receiving the DR-REP packet transmitted upwards in non-storing mode, the root changes direction of the DR-REP packet, and transmits the DR-REP packet downwards to the node that initiated a local DODAG repair using source routing.

10. The method of claim 5, wherein upon receiving the DR-REP packet transmitted downwards, a particular node updates and forwards the DR-REP packet downwards to the node that initiated a local DODAG repair by using a reverse routing table in storing mode or using source routing in non-storing mode, and the particular node reduces the rank so that the rank increases monotonically along a routing link from the root to any node.

11. The method of claim 5, wherein upon receiving the DR-REP packet, the node that initiated a local DODAG repair discovers an alternate routing link to the root, and the DODAG is repaired locally.

12. The method of claim 1, further comprising:
reducing the new rank between ranks R(i) and R(j) by dividing both the numerator and the denominator by a largest common factor.

13. The method of claim 1, further comprising:
constructing the DODAG using the DIO packet and the rank split operation, wherein the DIO packet is transmitted using a trickle timer.

14. The method of claim 13, wherein a node update a state only if one of the following conditions holds:
(1) a DODAG version number in the DIO packet is greater than a DODAG version number of a receiving node; and
(2) the DODAG version number in the DIO packet equals the DODAG version number of the receiving node, and the rank in the DIO packet is lower than the rank of the receiving node.

15. The method of claim 13, wherein the DIO packet transmission continues until all smart meters nodes in the network receive the DIO packets and update respective state parameters until the DODAG is completely constructed.

16. The method of claim 1, further comprising:
repairing the DODAG locally using a DODAG repair request (DR-REQ) packet and a DODAG repair reply (DR-REP) packet:, wherein the DR-REQ packet is generated and transmitted when a particular node needs to discover an alternate routing link, to the root, wherein the DR-REP packet is generated and transmitted when the particular node has a rank lower than the rank in a received DR-REQ packet, and the node receiving the DR-REQ packet has a valid routing link to the root.

17. The method of claim 16, wherein the repairing is in storing mode.

18. The method of claim 16, wherein the repairing is in non-storing mode.

19. The method of claim 1, wherein an upward link from a particular node to a particular parent is broken, and the particular node removes the particular parent from a parent set, schedules a No-Path Destination Advertisement Object (DAO) packet transmission in a storing mode or a DAO packet transmission in a non-storing mode, updates state parameters, generates and transmits a DODAG repair request (DR-REQ) packet to discover an alternative routing link to the root.

* * * * *